United States Patent [19]

Voss

[11] Patent Number: 4,557,985
[45] Date of Patent: Dec. 10, 1985

[54] POLYACETYLENE CELL WITH CERAMIC SOLID ELECTROLYTE

[75] Inventor: Ernst Voss, Hanover, Fed. Rep. of Germany

[73] Assignee: Varta Batterie Aktiengesellschaft, Hanover, Fed. Rep. of Germany

[21] Appl. No.: 457,662

[22] Filed: Jan. 13, 1983

[30] Foreign Application Priority Data

Jan. 22, 1982 [DE] Fed. Rep. of Germany ....... 3201909

[51] Int. Cl.$^4$ ............................................. H01M 6/18
[52] U.S. Cl. .................................... 429/191; 429/213
[58] Field of Search ...................... 429/191, 193, 213

[56] References Cited

U.S. PATENT DOCUMENTS 4,321,114  3/1982  MacDiarmid et al. ............. 429/213
4,439,502  3/1984  Bittihn et al. ........................ 429/104

FOREIGN PATENT DOCUMENTS 0061962  10/1982  European Pat. Off. ............ 429/191
0052868  5/1981  Japan .................................. 429/191

Primary Examiner—Donald L. Walton
Attorney, Agent, or Firm—Weiser & Stapler

[57] ABSTRACT

A one-piece galvanic solid element can be produced by directly polymerizing acetylene onto the surfaces of a disc-shaped ceramic solid electrolyte, using Ziegler-Natta catalysts. Starting from the polyacetylene layers so formed, negative electrode polarity is imparted to one layer and positive electrode polarity to the other layer, through immersion of the element in a suitable doping solution (e.g. $NaPF_6$ in $CH_2Cl_2$) and electrochemical polarization. As electrolyte material there can be used $\beta\text{-}Al_2O_3$, and mixed crystal compounds such as $Na_3 Zr_2 Si_2 PO_{12}$, which are Na-ion conductive, or Li-ion conductive $Li_3N$. Replacement of the negative polyacetylene electrode with Li or Na is possible.

9 Claims, No Drawings

POLYACETYLENE CELL WITH CERAMIC SOLID ELECTROLYTE

The invention relates to a galvanic element having a solid positive and solid negative electrode, at least one of which consists essentially of polyacetylene, as well as a solid electrolyte.

Through the activities of Alan G. MacDiarmid and others (see, for example, Organic Batteries: Reversible n- and p- type Electrochemical Doping of Polyacetylene, $(CH)_x$ by David MacInnes, Jr., Mark A. Druy, Paul J. Nigrey, David P. Nairns, Alan G. MacDiarmid and Alan J. Heeger, J.C.S. Chem. Comm., 1981, 317) the so-called polyacetylene battery has been added to the previously known electrochemical current sources. This battery is based on the fact that the organic polymer polyacetylene can be doped in the form of thin foils both with cations and with anions by electrochemical means. In so doing, not only is the conductivity of the polymer enhanced by orders of magnitude but a partial oxidation, or rather reduction thereof takes place. This creates the possibility of utilizing doped polyacetylene as the positive or rather negative active electrode material in an electrochemical element.

As doping media there can be used salts which are composed, for example, of the cations $Li^+$ or $n\text{-}(C_4H_9)_4N^+$ and the anions $ClO_4^-$, $AsF_6^-$, $PF_6^-$. If a polyacetylene foil is brought together with a Pt sheet in the solution of one of the salts in an organic solvent, and if it is then connected with the poles of a potential source, in such a manner that the polyacetylene becomes the anode, and the sheet becomes the cathode, then the occurrence of current flow is accompanied by a process which is, for example, in accordance with equation 1 below:

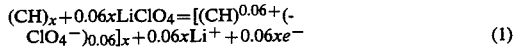

(1)

The factor 0.06 indicates that 6 Mol percent of the $(CH)_x$ foil is doped with $ClO_4^-$, whereby the polyacetylene itself is transformed into a stabilized, positively charged polycarbon ion $(CH^{0.06+})_x$. The anion $ClO_4^-$ is not oxidized in this process, which is comparable to an electrochemical charging, and in which an oxidized, p-doped polyacetylene is created. Rather it serves within the complex that is formed only as counter ion for the maintenance of electrical neutrality.

A treatment of the polyacetylene foil which is the same in principle, but carried out with inverse current flow direction, results in the formation of a reduced, N-doped $(CH^{0.06-})_x$ according to equation 2:

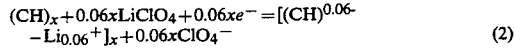

(2)

If the p-doped and the n-doped polyacetylene foil is then connected together via a resistance, there flows between them a discharge current which reverses the external doping:

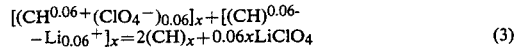

(3)

Thus there exists here in principle an electrochemical secondary element whose active electrode components can be made almost entirely of organic material and in which the charging, or alternatively discharging processes are always based upon doping reactions using externally introduced ions or alternatively a reversal or elimination of said dopants.

Batteries of this type are of interest because of the lightness of their electrode materials and the high energy density relative to their weight which results therefrom, as well as because of their favorable enviromental properties. In order to also eliminate, in this case, the disadvantages of a fluid electrolyte, it has already further been proposed in German Patent Application No. P3139400, filed Oct. 3, 1981, to produce galvanic cells of the polyacetylene type as complete solid cells. This is done by using an alkaline oxide polymer, e.g. polyethylene oxide, for the conductive salt, instead of the conventional organic substance, thereby forming with alkaline metal salts solid products having good ion conductivity.

Accordingly, it is an object of the present invention to provide an organic solid element with electrodes based on polyacetylene, which has a further increased degree of compactness and which can be produced by manufacturing techniques already being practiced for modern solid batteries.

This object is achieved in accordance with the invention by making the solid electrolyte of a ceramic solid body, onto which the organic electrode material is directly polymerized.

As the ceramic solid electrolyte within the scope of the invention there are particularly suitable $\beta\text{-}Al_2O_3$; mixed crystal components of the quaternary system $ZrO_2\text{-}P_2O_5\text{-}SiO_2\text{-}Na_2O$, which are Na-ion conductive; or the Li-ion conductive solid electrolyte lithium nitride, $Li_3N$. The latter is described in further detail in German Patent Publication (Offenlegungsschrift) No. 2,750,607. The mixed crystals mentioned above constitute electrolyte material disclosed only very recently and having remarkable crystal chemical and electrical properties (see German Patent Application No. P3032894, corresponding to U.S. patent application Ser. No. 297,465, filed Aug. 20, 1981 and German Patent Application No. P3123099, corresponding to U.S. patent application Ser. No. 369,364, filed Apr. 19, 1982) now U.S. Pat. No. 4,394,280. These solid electrolytes are producible not only in the form of single crystals, but also as sintered bodies. To the originally disclosed so-called Nasicon (sodium super ion conductor) with the composition $Na_3Zr_2Si_2PO_{12}$, other series of mixed crystals of similar type have been added in the interim. The existence regions of the mixed crystals which are usable here are positioned, in a spatial representation of the four-component system as tetrahedrons with the points $ZrO_2$, $P_2O_5$, $SiO_2$ and $Na_2O$, in predetermined cleavage planes within these tetrahedrons. A particularly desirable compound of the above mentioned series of mixed crystals has the composition $Na_{2.94}Zr_{1.54}Si_{2.2}P_{0.8}O_{10.53}$. This is characterized by exceptional chemical stability relative to sodium and by high ion conductivity, which reaches approximately $11 \times 10^{-4} \Omega^{-1} cm^{-1}$. The practical processing of such mixed crystals for use as the electrolyte in solid cells takes place currently in mass production by slicing them from round or rectangular wafers of desired size, a thickness down to 0.2 mm being achievable.

In accordance with the invention, it is now possible to produce the electrode material in situ upon these electrolyte wafers by polymerizing acetylene directly onto them. In this manner, there is obtained an extraordinarily stable solid cell in the form of a single integrated structural element.

From the literature there are known various methods of polyacetylene synthesis (see, for example, William H. Watson, Jr., Warren C. McMordie, Jr., and Larry G. Lands, J. Polym. Sci. Vol. 55, 137–144 (1961) and T. Ito, H. Shirakawa, and S. Ikeda, J. Polym. Sci., Polym. Chem. Ed., 12, 11–20 (1974). The polymerization of the monomer takes place with the aid of so-called Ziegler-Natta catalysts in a non-reactive organic solvent. The above-mentioned catalysts are metal-organic compounds, mostly mixed systems such as of the type $TiCl_4$-$Al(C_2H_5)_3$, $Ti(OC_4H_9)_4$-$Al(C_2H_5)_3$, $TiCl_4$-$Al(i$-$C_4H_9)_3$, or $TiCl_4$-$n$-$C_4H_9Li$. Further information about these catalysts may be found, for example, in Romps Chemie Lexicon published by Franckh' Sche Verlagshandlung, Stuttgart, Germany, pages 3978 and 3979.

For the purpose of the present invention it has proven desirable to spray the surfaces of the sintered ceramic electrolyte wafers with the solution of a Ziegler-Natta catalyst in toluol and then to expose the sprayed wafers to an acetylene atmosphere, whereby the polyacetylene precipitates upon the surfaces with characteristics which can be controlled by temperature, time and catalyst concentration.

To prevent the formation of a short circuit between the electrodes via the edge of the wafer, this must be kept free of polyacetylene. Therefore, the deposition upon the surfaces takes place in sequence in accordance with the invention, e.g. in the following manner:

The wafers lie in cassettes, for example, which leave only one surface exposed. These cassettes can be transported in continuous movement through a chamber in which they are first sprayed with the above-mentioned catalyst solution and then exposed to the acetylene atmosphere.

In a second stage, they traverse a washing bath, in which the excess catalyst is washed away, after which drying takes place. Upon repeated traversal of the cassettes through the same equipment, or through a second equipment of similar construction which follows the first, the underside of the wafer, which had previously not been exposed to the solution and the acetylene, is coated with polyacetylene.

All intermediate operations of washing and drying must be performed in an inert atmosphere.

In the next process step, there takes place the differential doping of the two polyacetylene layers in a manner known in itself, e.g. by immersing the entire cell package in a solution such as $NaPF_6$ in $CH_2Cl_2$ and by appropriate polymerization of the polyacetylene electrodes, through doping of one electrode with $Na^+$- and the other with $PF_6^-$-ions. After this doping has been carried out completely and the cell package is removed from the doping solution and dried, there is present a polyacetylene solid cell according to the invention, whose cell action can be described as follows:

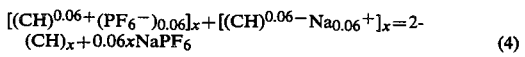
(4)

It is also within the scope of the invention to coat the solid electrolyte wafers on only one side with polyacetylene, while the other side is provided with an Li- or Na- foil layer depending upon the ion conductive characteristic (Li- or Na- ion conductive) of the solid electrolyte which is present, and by doping the polyacetylene layer with perchlorate through appropriate electrochemical polarization (anodic current) in a perchlorate containing solution. After drying, there is created in this manner a lithium battery, for example, which operates on the basis of the following reaction equation:

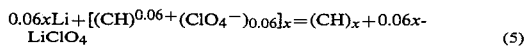
(5)

A preferred embodiment of the inventive galvanic element is based on a 1-piece solid electrolyte which preferably has two highly-porous segments suitable for receiving active electrode material, and a dense segment lying between the two, which constitutes the real solid electrolyte separator. Such a composite body and its production using sinter techniques are described in prior German Patent Application No. P3129679.3, corresponding to U.S. patent application, Ser. No. 357,408, filed Mar. 12, 1982 now U.S. Pat. No. 4,439,502. By filling the pore spaces of one or both sides of the solid electrolyte separator with polyacetylene in the course of the polymerizing process, particularly intimate contacting thereof with the electrolyte is achieved, and an element of higher compactness is produced following doping as described above.

A secondary cell can be achieved with lithium iodide as the doping medium, the electrochemical processes being shown in equation 6.

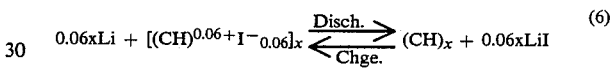
(6)

The solid galvanic elements embodying the invention are susceptible of miniaturization to an exceptional degree, due to their principles of construction. Their good applicability in all areas of consumer electronics is evident.

I claim:

1. In a galvanic element having a solid positive electrode, a solid negative electrode and a solid electrolyte, the improvement wherein:
    said solid electrolyte is a ceramic solid body; and
    at least one of said electrodes is comprised of polyacetylene directly polymerized onto the ceramic solid body.

2. The galvanic element of claim 1 wherein the negative electrode is a Li- or Na- electrode.

3. The galvanic element of claim 1 wherein the ceramic solid electrolyte is a Na- ion conductive material selected from the group consisting of $\beta$-$Al_2O_3$, $Na_3Zr_2Si_2PO_{12}$ and related mixed crystal compounds of the quaternary system $ZrO_2$-$P_2O_5$-$SiO_2$-$Na_2O$; or Li- ion conductive lithium nitride.

4. The galvanic element of claim 3 wherein the ceramic solid electrolyte is $Na_{2.94}Zr_{1.54}Si_{2.2}P_{0.8}O_{10.53}$.

5. The galvanic element of claim 3 wherein the negative electrode is a polyacetylene electrode doped with Li or Na.

6. The galvanic element of claim 1 wherein the solid electrolyte includes at least one highly-porous segment and wherein said solid electrode is polymerized onto said highly-porous segment of said solid electrolyte.

7. The galvanic element of claim 1 wherein both of said solid electrodes are comprised of polyacetylene directly polymerized onto the ceramic body.

8. The galvanic element of claim 7 wherein the solid electrolyte includes two highly-porous segments separated by a dense segment positioned therebetween, and wherein said solid electrodes are polymerized onto said highly-porous segments of said solid electrolyte.

9. In a galvanic element having a solid positive electrode, a solid negative electrode and a solid electrolyte, the improvement wherein:

said solid electrolyte is a ceramic solid body; and
at least one of said electrodes is comprised of polyacetylene which is directly polymerized onto the ceramic solid body, and which is thereafter doped to develop said electrode.

* * * * *